United States Patent
Jones

[15] 3,688,417
[45] Sept. 5, 1972

[54] TEACHING DEVICE

[72] Inventor: James A. Jones, 1637 Prospect Ave., Willow Grove, Pa. 19090

[22] Filed: June 4, 1971

[21] Appl. No.: 150,111

[52] U.S. Cl. .................................. 35/31 A, 35/76
[51] Int. Cl. .................................. G09b 19/02
[58] Field of Search ......... 35/31 R, 31 A, 31 B, 31 D, 35/31 E, 31 F, 76, 30, 48 R

[56] References Cited

UNITED STATES PATENTS

| | | | |
|---|---|---|---|
| 1,098,330 | 5/1914 | Pannenkowa | 35/76 |
| 1,618,560 | 2/1927 | Walters | 35/76 |
| 1,860,483 | 5/1932 | Sewall | 35/76 |
| 2,687,581 | 8/1954 | Williams | 35/76 X |
| 2,691,831 | 10/1954 | Jordan | 35/48 X |

FOREIGN PATENTS OR APPLICATIONS

| | | | |
|---|---|---|---|
| 28,119 | 1912 | Great Britain | 35/31 R |

*Primary Examiner*—Wm. H. Grieb
*Attorney*—Seidel, Gonda & Goldhammer

[57] ABSTRACT

A device for teaching fractions and their equivalents comprising a web of material having a plurality of horizontally disposed lines extending across it. The lines are divided into segments with each of the lines being divided into a different number of segments corresponding to different fractions. Means are provided for moving the web past a window whereby each of the lines and the fractions thereon may be observed by the student.

5 Claims, 3 Drawing Figures

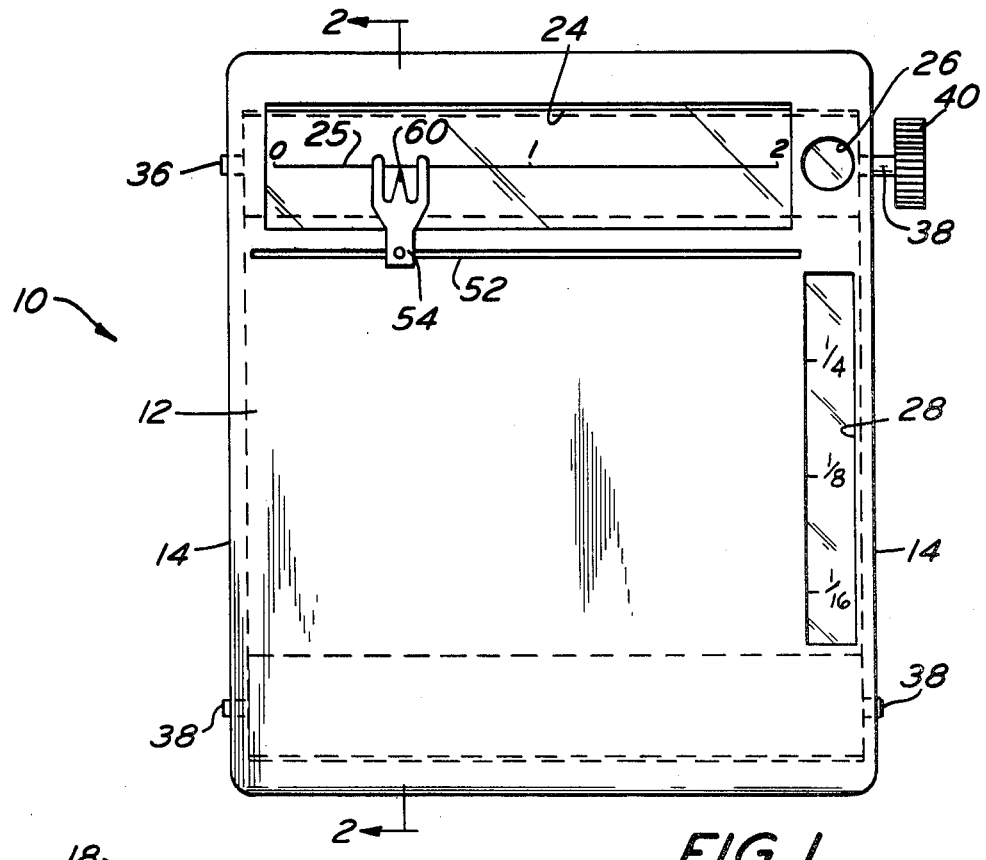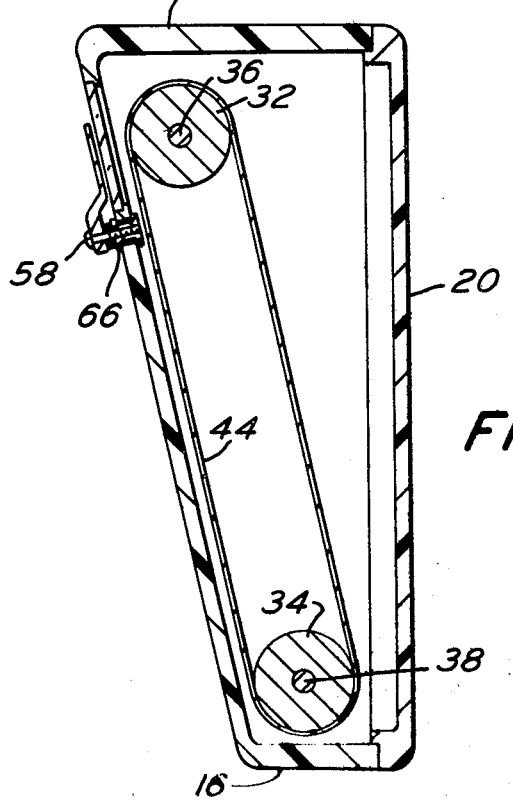

INVENTOR
JAMES A. JONES

TEACHING DEVICE

This invention relates to a teaching machine and more particularly to a machine which can be utilized for teaching fractions to students.

It is desirable to have a simple machine which can be manufactured at relatively low cost for teaching basic mathematics such as fractions to students.

A difficult concept for students to grasp in learning fraction is that of fractional equivalents.

Thus, it is often difficult for students to appreciate that some fractions are larger than others while still others are full equivalents of each other. Thus, it is desirable to be able to display these features of fractions graphically whereby a student can readily see the relationship of the various fractions to each other.

Additionally, such a device should be capable of hiding the answer until a desired time. This is so the student will have an opportunity to select for himself the correct answer before checking to see what the actual answer is.

Additionally, this invention generally relates to a teaching machine comprising a housing with a web adapted to move past an opening in the housing. The web supports indicia of the type to be taught so that it can be displayed through a window therein. The indicia comprises a plurality of fraction lines which are divided into segments with the segments identified according to their fractional equivalent of the line and a reference line so that the segments on the fraction line can be compared to the reference line.

Accordingly, it is an object of this invention to provide a novel and unobvious teaching machine.

It is another object of this invention to provide a teaching machine which is inexpensive to manufacture.

It is a further object of this invention to provide a teaching machine which can be handled easily by the student.

Other objects and advantages of the subject invention will be apparent from a detailed description thereof which follows wherein FIG. 1 is a plan view of the teaching machine constructed in accordance with the present invention.

FIG. 2 is a sectional view taken along line 2—2.

Figure 3:
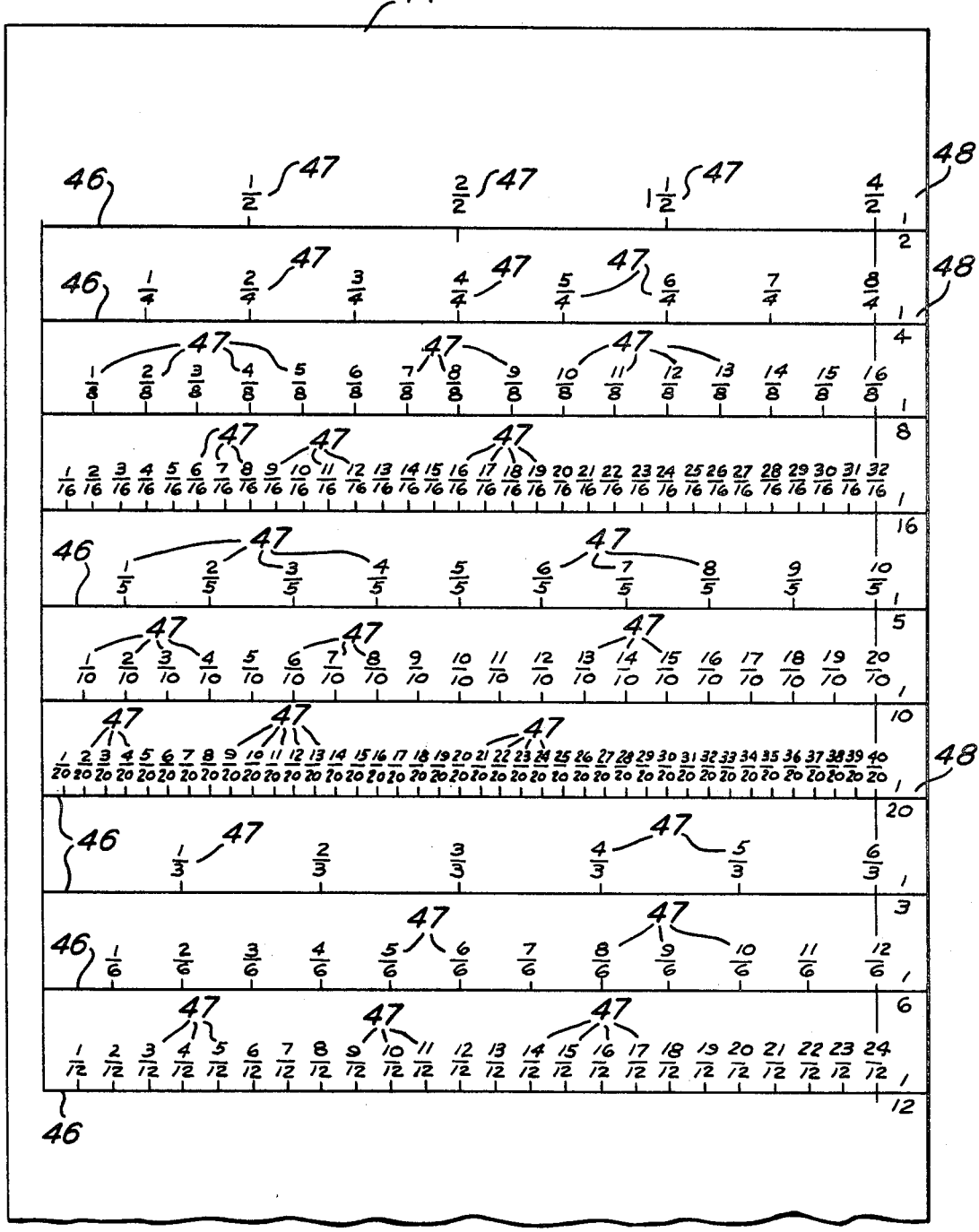
FIG. 3 is a plan view of the material which is displayed through a window in the teaching device.

Refer now to the drawing for a detailed description of the invention. There is seen in FIG. 1 a housing 10 which supports the teaching device. The housing comprises a top wall 12, side walls 14, and front wall 16, rear wall 18 and bottom wall 20. If desired, the rear wall 18 may be longer than the front wall so that the top of the teaching machine slopes toward the user thereby creating an easel type effect.

Additionally, if desired the device may be constructed of two pieces with the bottom 20 being separate and assembled to the remaining portion.

A top 12 of the teaching machine has an elongated window 24 therein. The window is horizontally disposed and extends substantially from side to side.

A reference line 25 is disposed along the longitudinal axis of window 24. The line is divided in half with one end identified by 0 and its midportion and other end identified by the integers 1 and 2. The reference line 25 and its integers may be formed in a transparent member overlying the window 24 or they may be defined by wire-like elements supported by the housing.

Adjacent the window is a relatively small aperture 26.

Immediately below the aperture, a second elongated window 28 is formed in the top of the housing. As is apparent from an inspection of FIG. 1, aperture 26 lies at the intersection of the longitudinal axes of windows 24 and 28.

As seen in FIG. 2, rollers 32 and 34 are journaled in the sides 14 of the housing by their shafts 36 and 38.

If desired, one of the shafts may have a means for rotating its respective roller. To this extent, one of the shafts 38 is provided with a knob 40 by which its roller may be rotated.

Entrained over the rollers is a web 44 having indicia of the type to be described thereon.

Referring now to FIG. 3, a web 44 is wrapped over the rollers. The web comprises a plurality of horizontal fraction lines 46 which are spaced from each other so that at any given time only one of the fraction lines is visible through elongated window 24.

Additionally, the ends of each fraction line are aligned with respect to each other and to the reference line 25 in the window 24 so that each line is exactly the same length as every other line.

The fraction lines 46 are divided by suitable means into a plurality of equal segments. The lines dividing the segments are identified by the appropriate fractional notation 47. Each fraction line is divided into a different number of segments. The number of segments is determined by the fraction which is to be taught by that line. For example, the first line may be divided into four segments, the first segment comprising one half while the first and second segments, i.e., the one half of the line comprises the numeral 1.

By scanning the remaining fraction lines vertically, it is possible to determine how all of the fractions relate graphically to each other. Thus, it can readily be seen that one-half is equivalent to two-fourths and that three-fifths is less than ten-sixteenths. Additionally, the student can readily see that five-thirds is greater than twenty-nine-twentieths while nine-fifths falls between 1 and 2.

Thus, the graphic portrayal of fractions greatly facilitates the student's understanding of them and their relation with respect to each other.

A row of characters 48 is positioned at the end of each of the lines. The character displayed is indicative of the fractions into which the line is divided. Thus, the first fraction line is identified by the fraction one-half while the remaining lines are identified by other fractions such as one-fourth, one-eighth, one-sixteenth, and the like. It is within the scope of this invention for the lines to be divided into any number of segments which are convenient and for the segments to be identified by corresponding characters 48.

When the web 44 is entrained over the rollers, the characters 48 are visible through window 28. When a line 46 is brought into view within window 24, the character identifying that line is visible through aperture 26 and the fractions on the line can be compared to the reference line 25. Rotation of knob 40 displaces the web so that lines can be brought into view as desired.

As seen in FIG. 1, the top housing is provided with a suitable track means such as a slot 52 which extends the length of window 24 and is adjacent thereto.

Slidably received in the slot is an indicator 54 which is sufficiently long to extend to the midportion of the window 24 into overlying relation to the web. The indicator may be supported by a bushing 66 which is connected thereto by a threaded shaft or bolt 58.

As seen in FIG. 1, the indicator 54 has three prongs with the center prong 60 being shorter than the outer prongs. This makes it possible to isolate a particular fractional notation 47 from the notations surrounding it.

In order to utilize the device, the student may move the web to the position illustrated in FIG. 1. Then, he will be asked to select that location where a particular fraction is located. The indicator is moved along track 52 until the center prong 60 is positioned at what is believed to be the correct location. Then, the student rotates knob 40 until the desired fraction series, such as one-fourths, or, one-halfs, appears in window 24. At that time, if the student has accurately selected the positioning of indicator 54, the fractional equivalent of the number first named will appear under indicator 60.

While the invention has been described with reference to one form thereof it is apparent that many other forms and embodiments will be obvious to those skilled in the art in view of the foregoing disclosure. Thus, the scope of the invention should not be limited by that disclosure but rather, only by the scope of the claims appended hereto.

I claim:

1. A teaching machine comprising a hollow housing, two spaced mutually parallel rollers journaled for rotation about their longitudinal axes in said housing, an endless web within said housing with said rollers being in driving relation thereto, an elongated window in said housing having its longitudinal axis parallel to said rollers so that a portion of said web is visible therethrough, a reference line supported along the axis of said window, said web having a plurality of horizontal fraction lines, said fraction lines and said reference line being parallel to said rollers and having their ends in mutual vertical alignment, means dividing each of said lines into a plurality of equal segments with the number of segments in each line being different, and each of said dividing means having adjacent first indicia identifying its fractional position on its respective line, and means for rotating said rollers so that various ones of said horizontal fraction lines are displayed through said window so that said first indicia identifying their fractional position thereon can be compared to said reference line and their relationship to each other taught to a student.

2. A teaching machine as defined in claim 1 including a second elongated window, said second window being disposed adjacent one of the sides of said housing with its longitudinal axis substantially perpendicular to the longitudinal axis of said first window, second indicia corresponding to the number of said segments in each of said fraction lines, said second indicia being disposed adjacent the ends of said respective fraction lines, and said second indicia are visible through said second window.

3. A teaching machine as defined in claim 1 including an aperture in said housing said aperture being adjacent one of the ends of said first elongated window, second indicia corresponding to the number of said segments in each of said fraction lines being disposed adjacent the ends of said respective lines, said fraction lines being spaced from each other so that only one fraction line and its first indicia is visible through said window at a given time, and said second indicia adjacent the end of each fraction line is visible through said aperture when its respective fraction line is visible through said first elongated window.

4. A teaching device as defined in claim 2 including elongated track means on said housing adjacent to said first window, and indicator means slidably received in said track means for movement therealong, said indicator means being of sufficient size to extend from said track means into overlying relation with respect to said web to thus point to indicia on said web.

5. A teaching machine as defined in claim 2 including an aperture in said housing, said aperture being located at the intersection of the axes of said first and second elongated windows, said fraction lines being spaced from each other so that only one of said fraction lines and its indicia is visible through said first elongated window at a given time, and said indicia adjacent the ends of each fraction line is visible through said aperture when its respective fraction line is visible through said first elongated window.

* * * * *